Figure 3:
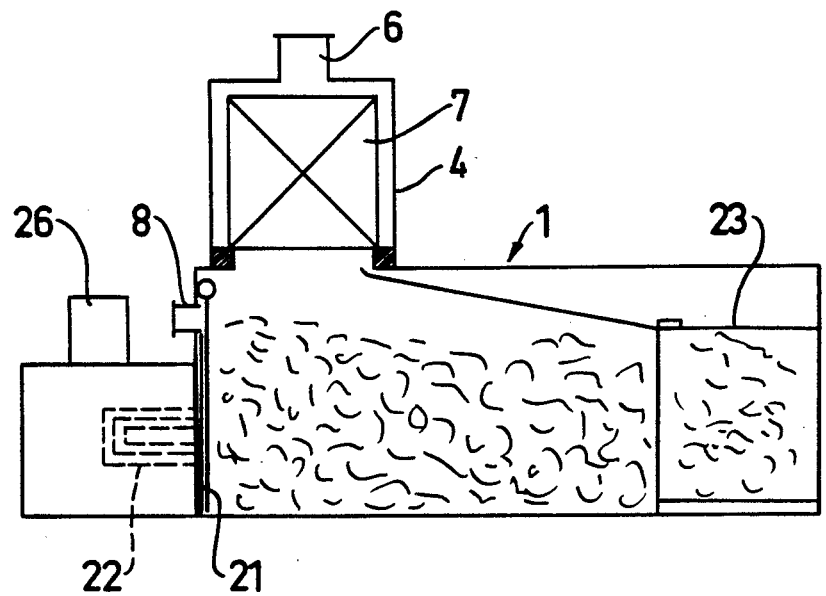

United States Patent [19]

Sjödin

[11] Patent Number: 4,541,846
[45] Date of Patent: Sep. 17, 1985

[54] METHOD OF RECOVERING ENVIRONMENT-DETRIMENTAL MATERIAL

[75] Inventor: Carl A. Sjödin, Sollentuna, Sweden

[73] Assignee: Armerad Betong Vagforbattringar Aktiebolag, Solna, Sweden

[21] Appl. No.: 548,639

[22] Filed: Nov. 4, 1983

[30] Foreign Application Priority Data

Nov. 11, 1982 [SE] Sweden .................. 8206419

[51] Int. Cl.⁴ .............................. B01D 46/00
[52] U.S. Cl. .................. 55/97; 55/385 A; 55/385 D; 106/99
[58] Field of Search ............. 55/97, 385 A, 385 D, 55/1, 84, 220; 106/99

[56] References Cited

U.S. PATENT DOCUMENTS

| | | | |
|---|---|---|---|
| 3,271,186 | 9/1966 | Sadler et al. | 106/99 |
| 3,675,393 | 7/1972 | Meade | 55/97 |
| 4,190,456 | 2/1980 | Absolon et al. | 106/99 |
| 4,316,514 | 2/1982 | Jysky | 175/66 |
| 4,396,590 | 8/1983 | Cheng | 55/97 X |

Primary Examiner—Charles Hart
Attorney, Agent, or Firm—Wood, Dalton, Phillips, Mason & Rowe

[57] ABSTRACT

In a method of in situ recovering and rendering harmless material detrimental to environment, for example asbestos and the like, the material is transported together with ambient air by means of vacuum from the place in situ to a space, in which the material is separated from the air, which is led off upward, filtered and removed. The material is moved from the space and sprayed and/or injected with a substance permanently binding the material, and the material thus bound in the form of manageable units is removed intermittently or continuously from the space.

9 Claims, 5 Drawing Figures

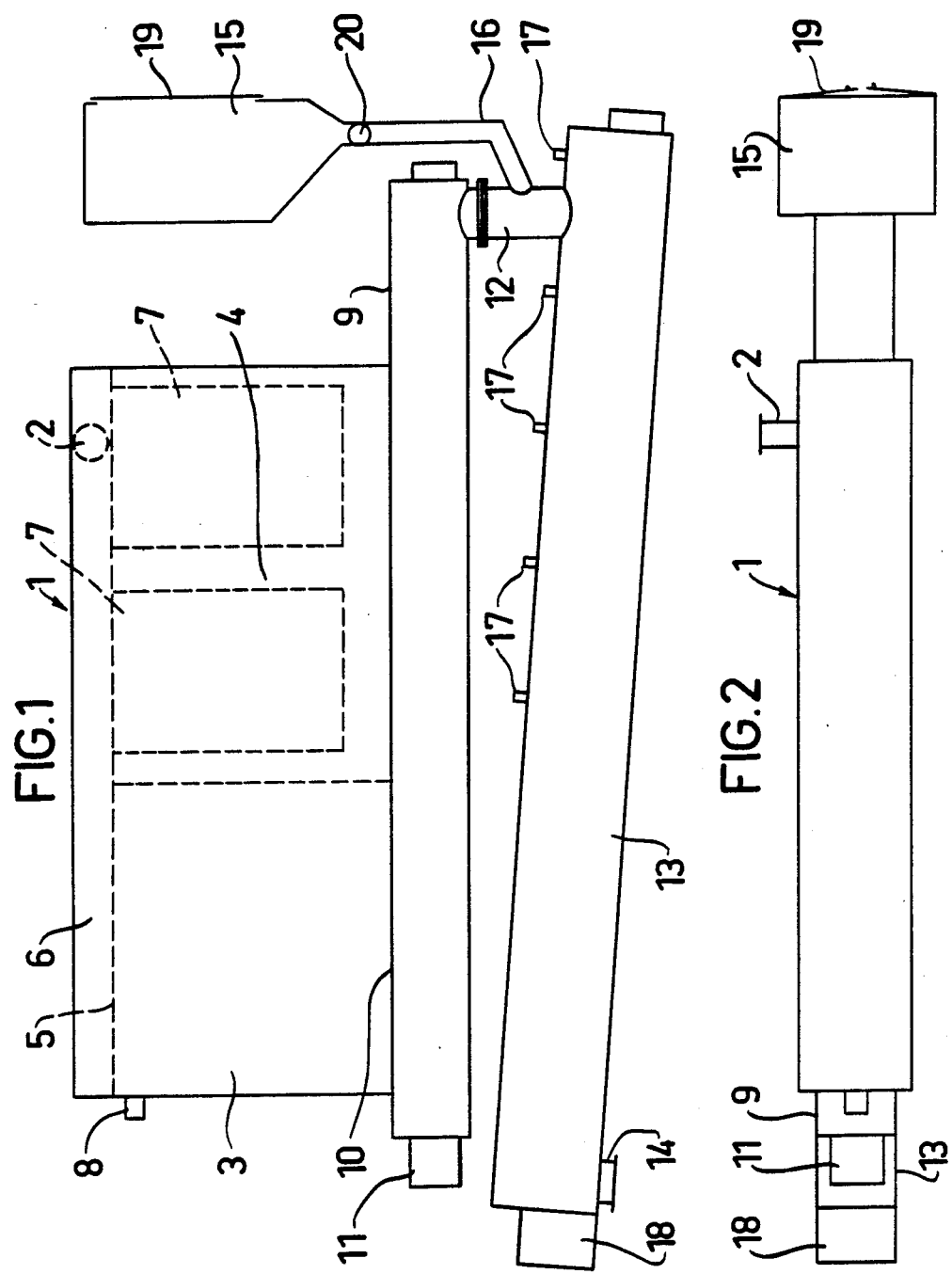

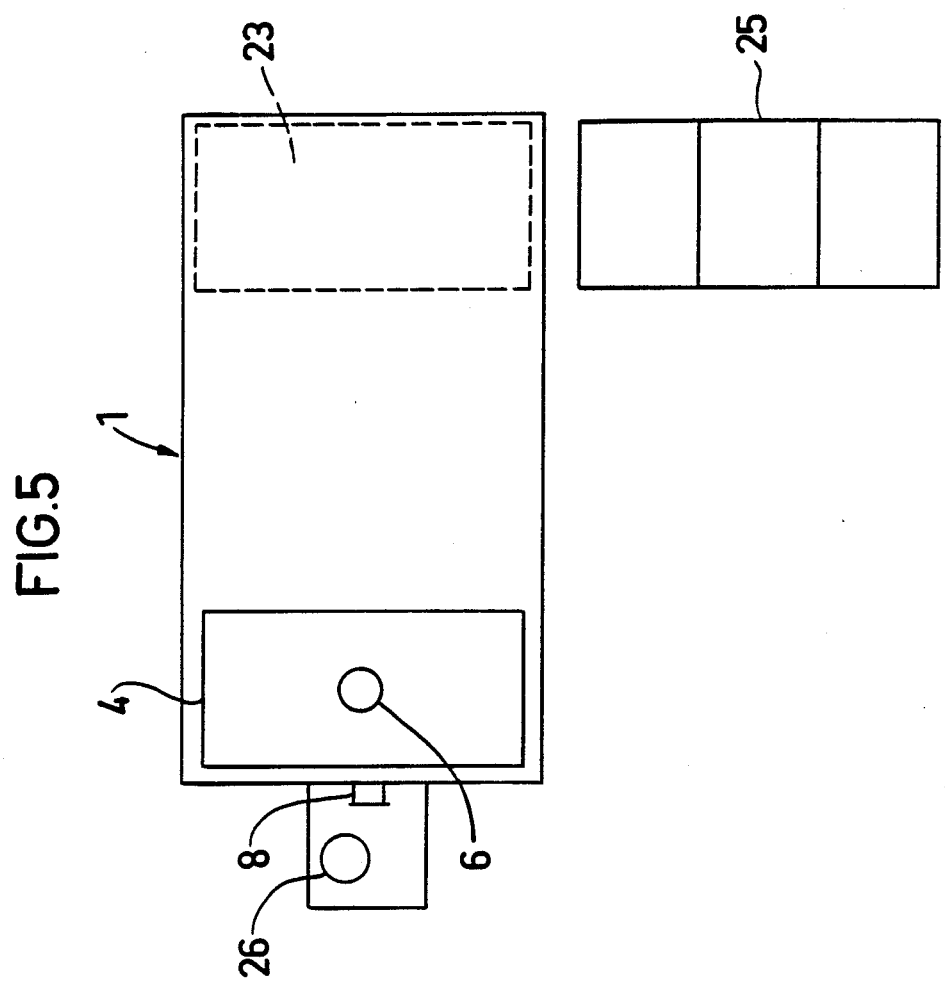

METHOD OF RECOVERING ENVIRONMENT-DETRIMENTAL MATERIAL

This invention relates to a method of recovering material detrimental to the environment, in such a way, that the material cannot be spread to the surroundings and thereby detrimentally affect the environment and human beings. One such material, among others, is asbestos.

Asbestos is generally present in modern society, although its fields of application now are ever increasingly restricted, because asbestos is harmful to human beings. Asbestos by its nature adheres in the lungs when it is inhaled and from there spreads to other parts of the body. Asbestos has been very widely used as insulation material in the construction field, in heating installations, and as a fire-retarding material in floor structures, partition walls and the like. Owing to the increasing severeness of environmental problems, great difficulties have arisen when buildings and installations, in which asbestos had been used, are demolished and reconstructed.

It is known today at the demolishing of asbestos and reconstruction of asbestos-loaded areas to suck the asbestos material to a container, from which the asbestos material now decomposed to dust-like material is removed packed in plastic bags. These bags are transported, for example, to garbage stations where they are stored or buried. It is easy to understand that during all these handling operations there is risk that the asbestos finds its way outside the bags, both when the asbestos is being filled into the bags, and during their transport when a bag is damaged, and also when the garbage station later on is dug up and the dust-like asbestos thereby is exposed.

In the case of great asbestos amounts, the container is transported directly, for example, to the garbage station where water is poured over the asbestos to prevent dust formation.

The present invention as it is defined in the characterizing clauses of the claims, renders it possible to entirely eliminate the risk of contamination of the surroundings by asbestos, from the moment when asbestos is demolished in situ until it has been transported for final storage. Even in a later phase when the asbestos for some reason again is handled after its final storage, there is no risk of environment contamination.

Figure 4:
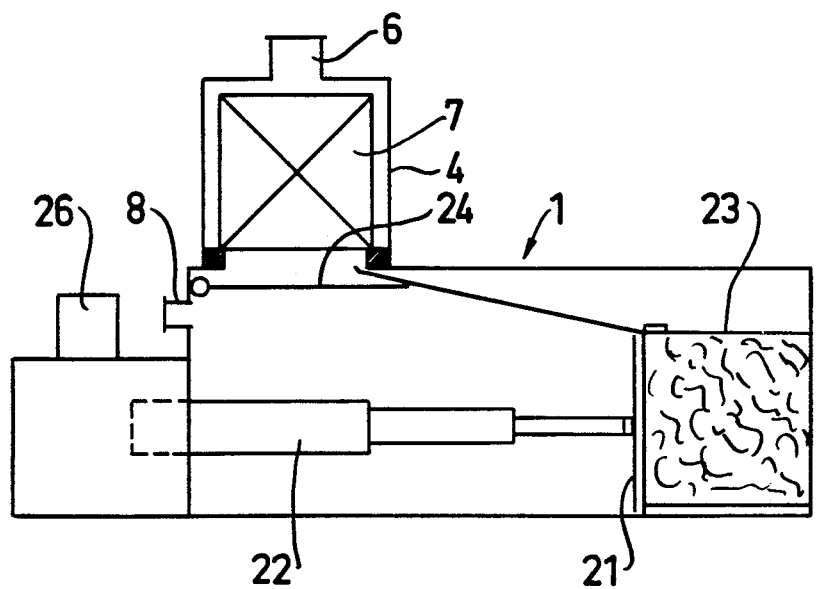

The invention is described in greater detail in the following by way of example and with reference to the accompanying drawings, in which FIGS. 1 and 2 show from the side and, respectively, from above an embodiment of an arrangement for carrying out the method according to the invention, and FIGS. 3-5 show from the side in two operation positions and, respectively, from above a second embodiment.

According to the invention, a space in the form of a container 1 is used, which is connected to a fan means, which with its suction side is connected upwardly via a connecting piece 2 (FIGS. 1 and 2) to said space 1. The space is divided into a gravity chamber 3 and a filter chamber 4. The gravity chamber 3 is separated by a partition wall 5 from the suction chamber 6, into which the connecting piece 2 opens, and two filters 7 are suspended on the continuation of the partition wall 5 in the filter chamber 4. A connecting piece 8 is provided to the gravity chamber 3 beneath the partition wall 5, and a hose (not shown) can be connected to the connecting piece 8. The free end of the hose can be formed as a nozzle, collecting cup, brush or the like, which is intended in situ, directly at the demolishing and decontamination of the asbestos to suck in the asbestos together with the ambient air for being transported to said space. The free end with the nozzle or the like can be handled easily by the workers and be suspended or positioned in a suitable place for keeping the working area to the greatest possible extent free from dust.

In the space 3 the asbestos is coarsely separated from the conveying air in the gravity chamber 3, in which heavy and large particles and pieces drop down to the bottom of the space 1. Particles of lighter weight and dust are sucked from the gravity chamber to the filter chamber 4, the filters 7 of which clean the air which flows out from the space 1 via the connecting piece 2, as stated. The asbestos, which during the transport through the hose has been broken down to small pieces and a more or less fine dust, thus, is collected on the bottom of the space 1.

Beneath the space 1 a screw conveyor 9 is located, the conveying screw of which preferably has progressive pitch. The bottom 10 of the space 1 is open to the conveyor 9, into which, thus, the asbestos material drops down when the arrangement is in operation. At the same time as the material is transported by the screw to the right-hand end of the conveyor 9, in FIG. 1, the material is broken down additionally to smaller dimensions. 11 designates schematically the driving motor of the conveyor. Via a down pipe 12 at the right-hand end of the conveyor 9 the asbestos material arrives at one end of a second, slightly upward inclined screw conveyor 13, which at the other end is provided with an outlet connecting piece 14. 15 designates a cement bin, which by a pipe 16 is connected to the down pipe 12, and 17 designates water nozzles opening into the conveyor 13, the driving motor of which is designated by 18. Via a cover 19 a cement bag can be positioned in the cement bin 15.

When the asbestos material drops down through the down pipe 12 and into the conveyor 13, the material is mixed with cement, the flow amount of which can be adjusted in a suitable way, for example by means of a valve 20. In the conveyor 13 the asbestos material mixed with cement is poured over with water from the nozzles 17 and is thoroughly wetted with water during the continued transport to the outlet 14. The connecting piece 14, for example, can open into an outlet nozzle (not shown) which can be enclosed by a bag, hose or the like located outside the conveyor 13. When the bag is filled with the material mixed with cement and wetted, the bag is removed for being further transported and handled. The material then preferably should have hardened. When using hoses, it may be suitable as the hose is being filled to cut off therefrom pieces suitable to handle. These pieces then also can have been permitted to harden to a solid body, because the material has hardened (the cement has solidified).

By supplying the cement and water after the screw conveyor 9, which is in direct contact with the space 1, no critical cleaning problems arise. Only the lower screw conveyor 13 requires cleaning, according to the operation conditions. This cleaning, however, is entirely dust-free.

In the filter chamber 4 and gravity chamber 3 of the space 1 a level guard of some type can be provided to control the movement of the conveyor screw 9 so that the screw is started first when the filling degree has reached a certain level in the space 1, i.e. the chambers 3 and 4. This occurs because the asbestos material is very compressible, and the cement can be added in controlled amount to the batchwise transported material. The cement addition is of the magnitude 10-20% of the asbestos material.

In FIGS. 3-5 an embodiment is shown, at which in principle the conveyors 9 and 13 have been replaced by a scraping device in the form of a vertical plate 21 located in the space 1. Above the same the filter chamber 4 with filters 7 is located. The connecting piece 6 connected to a fan means sucks the asbestos material through the hose and connecting piece 8 into the chamber or space 1, whereby the air is separated from the material in the filter 7. The scraping device, which has a width corresponding to the width of the space 1, is located on that side where the hose is connected to and below the opening of the connecting piece 8. By means of a hydraulic piston means, for example, (indicated by 22), it is possible to move the plate 21 in the space 1 and thereby to move the asbestos material ahead of the plate away to the opposite side of the space. This side can be divided into a plurality of compartments or boxes 23, which are open to the space, and into which the material is pushed by the plate. At different positions of the plate 21 or, for example, in the final phase of the plate movement to the boxes 23, a suitable liquid substance, for example thermosetting resin, is sprayed into the collected asbestos material, which finally arrives in the boxes. As the dust-like asbestos material will be whirled about due to the movement of the plate through the space and due to the suction effect of the fan means, it is suitable at the start of the plate movement to simultaneously automatically close the inlet to the filter 7 by means of a cover 24. This packing process is repeated until the boxes have been filled, whereafter these boxes, for example in the form of a cassette 25, can be removed from the space for being transported further and handled. It is easily understood that the liquid sprayed in is of such a type that the time for its hardening is adjusted to the desired handling. 26 designates the driving motor for the scraping device 21.

The place where setting liquid is to be sprayed into the space or where during the transport the injection could be effected, of course, can be varied within the scope of the invention, depending on the configuration of the space, the packing device, the type of liquid, etc. The liquid can be setting in order to form solid constituents of the asbestos material, but the liquid also can be imagined to be of such a type as together with the material to form a tough or liquid mass. These manageable units obtained by the method, either in the form of solid parts, viscous or liquid bodies, of course, can be converted, for example, to pellets or briquets for being used as filler for different purposes. It also is possible to imagine re-use of the asbestos in a later phase.

What is claimed is:

1. A method of in situ recovering and rendering harmless material detrimental to the environment, for example asbestos, comprising the steps of:
   transporting the material together with ambient air by use of a vacuum from a place in situ to a space;
   separating the material from the air in the space;
   filtering the air;
   discharging air that has been filtered from the space;
   continuously adding a substance to the material to permanently bind the material;
   providing conveying structure that is operable to direct the material away from the space; and
   continuously operating the conveying structure so that material with the added substance can be continuously directed from the space and accumulated externally of the space into manageable units in which the material is permanently bound.

2. The method of claim 1 wherein said substance is cement and water.

3. The method of claim 1 wherein a first screw conveyor is provided in the space, the first screw conveyor directs the material to a second screw conveyor and cement is supplied to the material after the material has passed from the first screw conveyor, said second screw conveyor directing material with cement supplied towards a point of handling, whereby cement does not have to be cleaned from the first conveyor.

4. The method of claim 1 wherein the material removed from the space is packed into containers outside the space.

5. The method of claim 1 wherein the substance is sprayed on the material.

6. The method of claim 1 wherein the substance is injected into the material.

7. A method of in situ recovering and rendering harmless material detrimental to the environment, for example asbestos, comprising the steps of:
   providing first and second conveyors for transporting the material;
   transporting the material together with ambient air by use of a vacuum from a place in situ to a space;
   separating the material from the air in the space;
   filtering the air;
   discharging air that has been filtered from the space;
   transporting material through the space with the first conveyor;
   treating the material with cement after it has passed from the first conveyor; and
   transporting the material treated with cement with the second conveyor towards a point of handling, whereby the first conveyor does not come into contact with the cement and therefore does not require cleaning.

8. The method of claim 7 wherein in the space the material is passed together with the air first to a gravity chamber, in which heavy parts of the material drop down to the first conveyor, and then to a subsequent part of the space provided with filters, where the remaining material is separated from the air and drops down to the first conveyor.

9. The method of claim 7 wherein said first and second conveyors comprise screw conveyors.

* * * * *